Figure 1:
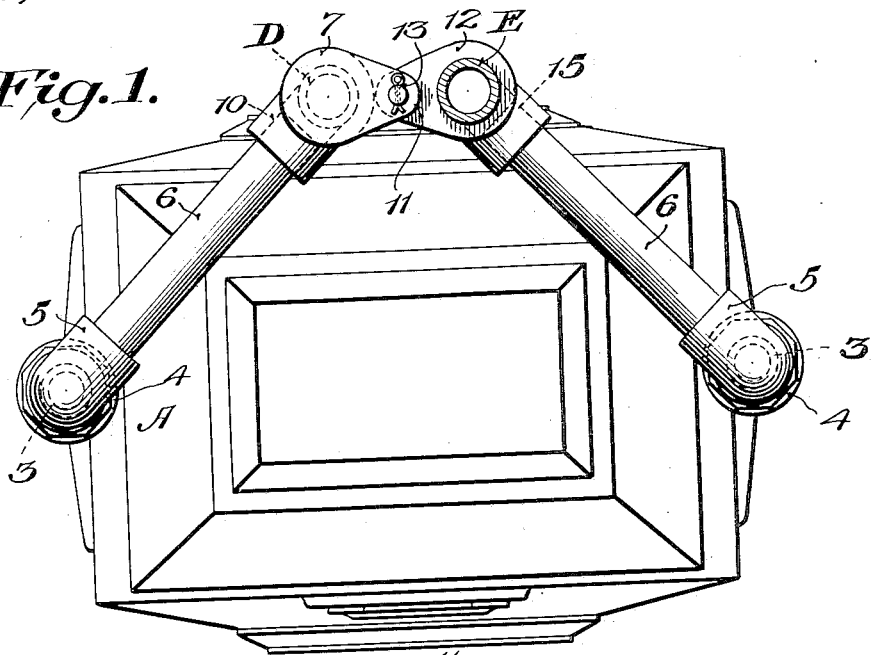

J. J. COYLE.
METER CONNECTION.
APPLICATION FILED SEPT. 30, 1918.

1,287,895.

Patented Dec. 17, 1918.

Witness:- Chas. L. Griesbauer

Inventor
James J. Coyle,
By Royal E. Burnham,
Attorney

UNITED STATES PATENT OFFICE.

JAMES J. COYLE, OF ALBANY, NEW YORK.

METER CONNECTION.

1,287,895.

Specification of Letters Patent.  Patented Dec. 17, 1918.

Application filed September 30, 1918. Serial No. 256,334.

*To all whom it may concern:*

Be it known that I, JAMES J. COYLE, a citizen of the United States, residing at Albany, in the county of Albany and State of New York, have invented certain new and useful Improvements in Meter-Connections, of which the following is a specification, reference being had therein to the accompanying drawing.

This invention relates to fittings for connecting gas or other fluid meters with a service pipe and with a pipe leading to fixtures to be supplied with fluid.

It is an object of the invention to provide a fitting for this purpose so arranged that undue strain will not be imposed on the meter, and to avoid the use of lead or similar connections.

When read in connection with the description herein, the details of construction and arrangement of parts contemplated by the invention will be apparent from the accompanying drawing, forming part hereof, wherein an embodiment of the invention is disclosed, for purposes of illustration.

While the disclosures herein now are considered to exemplify a preferable embodiment of the invention, it is to be understood that it is not the intention to be limited necessarily thereto in interpretation of the claims, as modifications within the limits of the claims can be made without departing from the nature and spirit of the invention.

Like reference characters refer to corresponding parts in the views of the drawing, of which—

Figure 2:
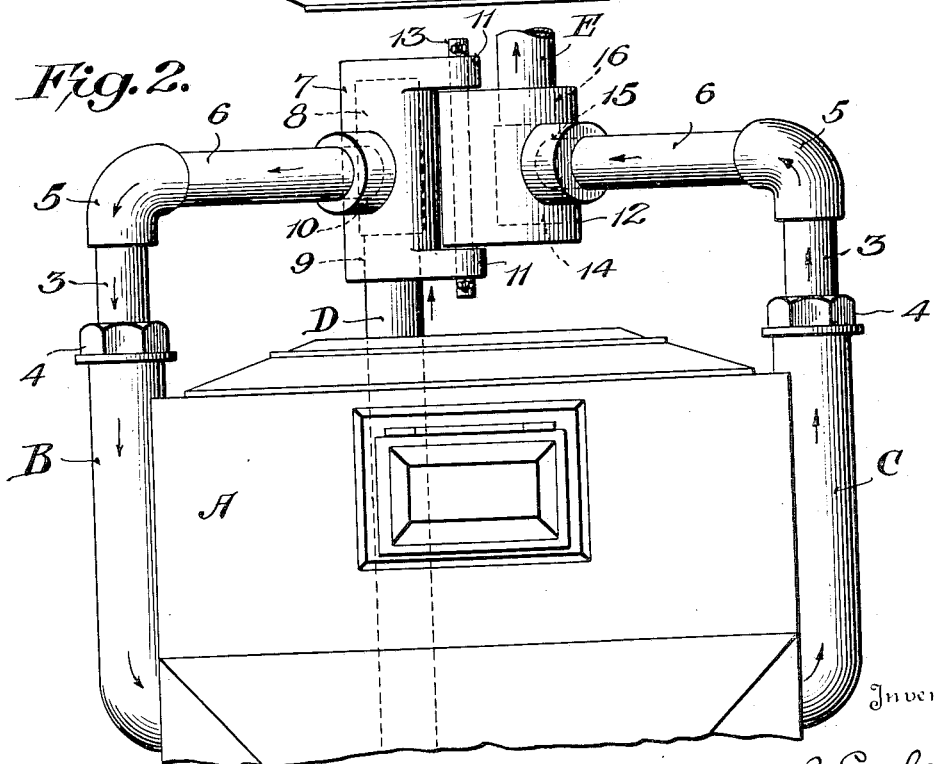

Figure 1 is a plan view; and
Fig. 2 is an elevation.

Having more particular reference to the drawing, A designates a meter, B and C, respectively, its inlet and outlet, D a pipe leading from a main or other source to the meter, and E a pipe leading from the meter to places to be supplied with fluid.

To each of the inlet and outlet of the meter a tail-pipe 3 is connected by a swivel joint 4, and to each tail-pipe an elbow 5 connects a short pipe 6, the arrangement being such as to permit the pipe 6 to be swung to bring their free ends adjacent to each other. The parts 3, 4, 5, and 6 are of cast metal or other suitable rigid material.

In order to connect the pipes 6 of the inlet and outlet, respectively, to the supply-pipe D and outlet-pipe E, a special fitting is provided.

One member 7 of this fitting has a passageway 8 therein, to which opens a threaded port 9 at one end arranged to have the supply-pipe D screwed thereinto, and from which leads laterally a threaded port 10 arranged to have screwed thereinto the pipe 6 connected with the meter-inlet. The member 7 has projections 11 at its ends extending laterally from the side opposite to the port 10.

The other member 12 of the fitting is arranged to fit in between the projections 11 of member 7, and the projections and member 12 have a pin 13 removably disposed therethrough, whereby the two members are connected by a hinge joint. The member 12 has a passageway 14 therein into which laterally leads a threaded port 15 arranged to have the outlet-pipe 6 screwed thereinto and from the end of which passageway leads a threaded port 16 arranged to have the pipe E screwed thereinto.

When a meter is to be connected to supply and outlet pipes, the pipes 6 and associated parts are connected to the meter inlet and outlet, if they are not already in place, and the members 7 and 12 are screwed onto their free ends at ports 10 and 15. The two members then are swung together and connected by having the pin 13 seated in place. Then the pipes D and E are connected, respectively, into ports 9 and 16.

The arrangement provided by the invention permits the meter and its connections to be brought easily and expeditiously to the places where the members 7 and 12 can be connected to the inlet and outlet pipes without imposing undue strain on the parts, and those members are held in association by the pin so that the weight of the meter may be carried by the pipes, if that is desired.

Having thus described my invention, what I claim as new, and desire to secure by Letters Patent, is—

1. The combination, with supply and outlet pipes and a fluid-meter having an inlet and an outlet, of swingable pipes connected with said inlet and outlet, and a fitting comprising two members hinged together, one of said members having a passageway connected with said supply-pipe and with the swingable pipe connected with said inlet, and the other of said members having a passageway connected with the swingable pipe connected with said outlet and with said outlet-pipe.

2. The combination with supply and outlet pipes and a fluid-meter having an inlet and an outlet, of pipes connected with said inlet and outlet and swingable to bring their free ends adjacent to each other, and a fitting comprising a member having projections and a member arranged to fit between said projections and a removable pin seated in said latter member and said projections, one of said members having a passageway connected with said supply-pipe and the swingable pipe connected with said inlet, and the other of said members having a passageway connected with the swingable pipe connected with said outlet and with said outlet-pipe.

3. A meter-connection comprising a member having projections, a member arranged to fit between said projections, and a removable pin arranged to seat in said latter member and said projections, one of said members having a passageway and ports opening thereto arranged to receive meter-supply pipes and the other of said members having a passage-way and ports opening thereto arranged to receive meter-outlet pipes.

In testimony whereof I affix my signature.

JAMES J. COYLE.